March 11, 1941.       C. ORT       2,234,707
PHOTOGRAPHIC OBJECTIVE
Filed Aug. 19, 1939

Inventor
Carl Ort

Patented Mar. 11, 1941

2,234,707

UNITED STATES PATENT OFFICE 2,234,707

PHOTOGRAPHIC OBJECTIVE

Carl Ort, Stuttgart, Germany, assignor to Eastman Kodak Company, Rochester, N. Y., a corporation of New Jersey Application August 19, 1939, Serial No. 291,045
In Germany October 18, 1938

3 Claims. (Cl. 88—57)

This invention relates to photographic objectives and particularly to meniscus objectives such as used on box cameras and inexpensive folding cameras.

It is an object of the invention to provide a simple photographic objective which may be focused continuously throughout its focusing range and which gives a satisfactory image at each point of its focusing adjustment. Such an objective eliminates the need for auxiliary lenses, usually called portrait attachments and has the advantage over such portrait attachment that it may be focused for various distances rather than just one near distance.

It is also an object of the invention to provide such a lens which is inexpensive to manufacture.

It is a particular object of the invention to provide a lens in which the focusing adjustment is small compared to the amount of focusing obtained.

According to the invention, an objective of the type in which the diaphragm is to the rear of the lens components, consists effectively of two meniscus components. The front component is positive and the rear one is made up of two spaced lenses whose axial separation is adjustable to focus the objective. Preferably the whole objective consists of the following elements in the order named: a front meniscus positive element convex to the incident light, a convex plano element a fixed distance from the meniscus element, a plano concave element at an adjustable distance from the convex plano element and a diaphragm at a fixed distance behind the plano concave element.

Other objects and advantages of the present invention will be apparent from the following description when read in connection with the accompanying drawing in which.

Figure 1:
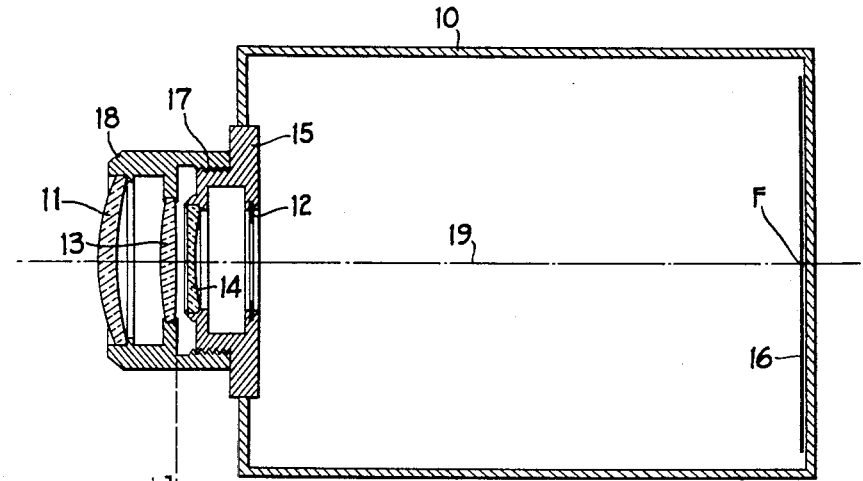
Fig. 1 illustrates an embodiment of my invention with the objective focused for infinity.
Figure 2:
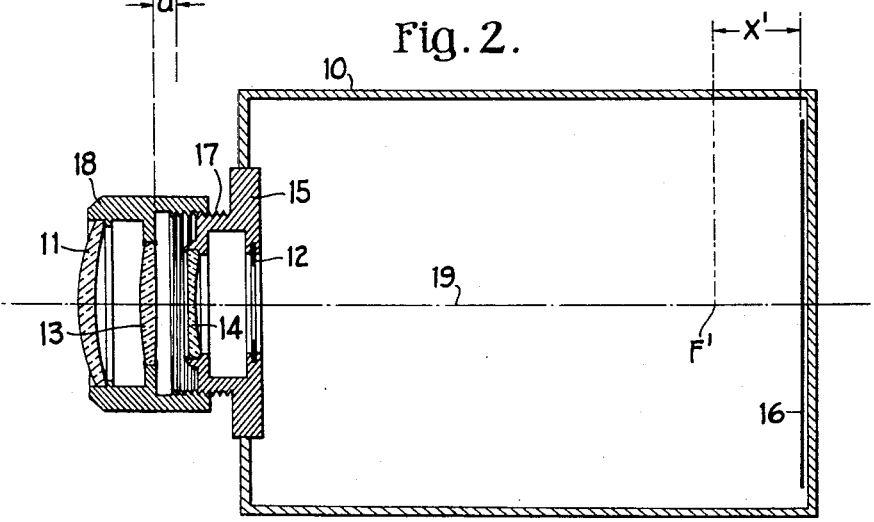
Fig. 2 illustrates the same embodiment of the invention with the objective focused for a near distance.

In Figs. 1 and 2 a camera housing which may be of any suitable type such as a bellows or telescoping tube, but which is shown for simplicity as a simple box 10, is provided with a film plane defining means 16. Preferably, this film plane defining means 16 is some form of pressure plate, but it is common practice in inexpensive cameras to use a simple flat or slightly curved guide for this purpose. The opposite wall of the housing 10 is provided with a lens mount consisting of two parts 15 and 18. There is supported by the mount, a diaphragm 12 and three lens elements 11, 13, and 14 axially spaced in front of the diaphragm 12 on the optic axis 19. The axial spacing of the diaphragm 12 and the lens element 14 is fixed and the axial spacing of the elements 11 and 13 is also fixed. On the other hand, the lens mount 15 is provided with any suitable focusing means shown as a screw thread 17 for adjusting the axial spacing of the lens elements 13 and 14.

In Fig. 1, the camera is focused for infinity and hence the focus F of the objective falls on the image plane 16. In Fig. 2 the focusing portion 18 of the lens mount 15 has been rotated so that the spacing between the elements 13 and 14 is increased by a distance $d$. If the whole objective consisted of a single lens element, this amount of adjustment of this lens element would cause the focal point F also to move forward a distance $d$. However, in the arrangement shown, the objective is not only moved forward but it is also increased in power so that the focal point moves through a distance X' to the point F' on the optic axis 19. Thus with a relatively small adjustment $d$, the camera is focused for a very close distance.

Preferably, the lens element 11 is meniscus and concave toward the image plane, the lens element 13 is convex plano and the lens element 14 is plano concave, all with their curved surfaces concave toward the diaphragm and image plane. However, if desired, each of these components may be made compound to correct for aberrations in the usual way.

Having thus described in detail, one embodiment of my invention, I wish to point out that it is not limited to the specific structure shown but is of the scope of the appended claims.

What I claim and desire to secure by Letters Patent of the United States is:

1. A photographic objective comprising a diaphragm and three lens elements axially spaced on one side of the diaphragm, the element nearest the diaphragm being plano concave with its concave side toward the diaphragm, the element farthest from the diaphragm being a positive meniscus element concave toward the diaphragm, the intermediate element being convex plano with its plano surface facing the diaphragm, the spacing between the diaphragm and the plano concave element being fixed, the spacing between the meniscus element and the convex plano element also being fixed and the spacing between the convex plano and the plano concave elements being adjustable for focusing.

2. A photographic objective comprising a mount, a diaphragm carried by the mount, three lens components axially spaced on the front side of the diaphragm, the component nearest the diaphragm being negative with its rear surface concave toward the diaphragm and its front surface of substantially the same curvature as the rear surface of the component immediately adjacent thereto, the component farthest from the diaphragm being a positive meniscus component concave toward the diaphragm, the intermediate component being positive with its front surface convex toward the front component, the spacing between the diaphragm and the component nearest thereto being fixed, the spacing between the meniscus component and the intermediate component also being fixed and the spacing between the intermediate component and the component nearest the diaphragm being adjustable for focusing and means secured to the mount for adjusting said adjustable spacing.

3. A photographic objective comprising a diaphragm and three lens components axially spaced on the front side of the diaphragm, the component nearest the diaphragm being substantially plano concave with its concave side toward the diaphragm, the component farthest from the diaphragm being a positive meniscus component concave toward the diaphragm, the intermediate component being substantially convex plano with its plano surface facing the diaphragm, the spacing between the diaphragm and the plano concave component being fixed, the spacing between the meniscus and the convex plano component also being fixed and the spacing between the convex plano and the plano concave component being adjustable for focusing.

CARL ORT.